United States Patent
Gailloux et al.

(10) Patent No.: US 9,792,603 B1
(45) Date of Patent: Oct. 17, 2017

(54) COMPANION APPLETS FOR WEB-BASED TRANSACTIONS

(71) Applicant: Sprint Communications Company L.P., Overland Park, KS (US)

(72) Inventors: Michael A. Gailloux, Overland Park, KS (US); Lauren R. King, Somerset, NJ (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 713 days.

(21) Appl. No.: 13/759,034

(22) Filed: Feb. 4, 2013

(51) Int. Cl.
G06Q 20/32 (2012.01)
G06Q 40/00 (2012.01)

(52) U.S. Cl.
CPC ......... *G06Q 20/3227* (2013.01); *G06Q 40/00* (2013.01)

(58) Field of Classification Search
CPC ........................... G06C 20/3227; G06Q 40/00
USPC ............................................................ 705/44
See application file for complete search history.

(56) References Cited

U.S. PATENT DOCUMENTS

| | | | | |
|---|---|---|---|---|
| 7,523,486 B1 * | 4/2009 | Turner | ................. | G06F 21/604 707/999.009 |
| 8,099,363 B1 * | 1/2012 | Kilchenstein, Jr. | .... | G06Q 20/10 705/35 |
| 8,151,328 B1 * | 4/2012 | Lundy | ................. | H04L 63/083 726/5 |
| 8,352,370 B1 | 1/2013 | White et al. | | |
| 9,014,662 B1 * | 4/2015 | Gailloux | ................. | H04W 4/24 379/114.01 |
| 9,147,187 B1 * | 9/2015 | Gailloux | ............. | G06Q 20/3278 |
| 2002/0107755 A1 * | 8/2002 | Steed | .................... | G06F 17/243 705/26.1 |
| 2006/0265327 A1 | 11/2006 | Rao et al. | | |
| 2007/0156436 A1 * | 7/2007 | Fisher | .................. | G06Q 20/102 455/552.1 |
| 2009/0271246 A1 | 10/2009 | Alvarez et al. | | |
| 2010/0161433 A1 * | 6/2010 | White | .................... | G06Q 20/20 705/17 |
| 2011/0078081 A1 * | 3/2011 | Pirzadeh | ................ | G06Q 20/20 705/44 |
| 2011/0208658 A1 * | 8/2011 | Makhotin | ............... | G06F 21/34 705/75 |
| 2012/0029990 A1 * | 2/2012 | Fisher | .................. | G06Q 20/105 705/14.19 |
| 2012/0150667 A1 | 6/2012 | Salari | | |

(Continued)

OTHER PUBLICATIONS

Office Action dated Aug. 29, 2013, U.S. Appl. No. 13/714,17, filed Apr. 3, 2012.

(Continued)

*Primary Examiner* — Kenneth Bartley
*Assistant Examiner* — Michael J Warden

(57) ABSTRACT

Systems and methods for completing a transaction using an applet associated with a companion applet on portable electronic device. A least a portion of information from a user profile is obtained by the companion applet from a secure element on the portable electronic device using an application programming interface (API). The portion of information is then passed to the mobile applet and used to populate the fields needed for the vendor or payment processor to complete the transaction, and the transaction is treated as a card-present transaction.

10 Claims, 6 Drawing Sheets

(56) References Cited

U.S. PATENT DOCUMENTS

| | | |
|---|---|---|
| 2012/0289188 A1 | 11/2012 | Marcus et al. |
| 2013/0013499 A1 | 1/2013 | Kalgi |
| 2013/0054320 A1 | 2/2013 | Dorso et al. |
| 2013/0198066 A1 | 8/2013 | Wall et al. |
| 2013/0268752 A1 | 10/2013 | Morecki et al. |
| 2014/0359484 A1 | 12/2014 | Morecki et al. |
| 2015/0081435 A1 | 3/2015 | Griffiths |
| 2015/0101062 A1 | 4/2015 | Silver et al. |
| 2015/0110257 A1 | 4/2015 | Barbulescu et al. |
| 2015/0302470 A1 | 10/2015 | Dru et al. |

OTHER PUBLICATIONS

Final Office Action dated Mar. 26, 2014, U.S. Appl. No. 13/714,17, filed Apr. 3, 2012.
Advisory Action dated Jun. 16, 2014, U.S. Appl. No. 13/714,17, filed Apr. 3, 2012.
Examiner's Answer dated Feb. 4, 2015, U.S. Appl. No. 13/714,17, filed Apr. 3, 2012.
Second and Supplemental Examiner's Answer dated Mar. 9, 2015, U.S. Appl. No. 13/714,17, filed Apr. 3, 2012.
Dashlane, "Instant checkout, smart auto fill, secure passwords—Dashlane", https://dashlane.com/, last accessed Nov. 9, 2012.
Dashlane, "Secure encryption of your personal—Dashlane", https://dashlane.com/en/security, last accessed Nov. 9, 2012.
Dashlane, "Dashlane Security Whitepaper—Protection of User Data in Dashlane", Dashlane, Nov. 2011.
Dashlane, "Checkout easily online using Dashlane", https://dashlane.com/en/features, last accessed Nov. 9, 2012.
Dashlane, "Dashlane lets you fill out forms with a single click", https://dashlane.com/en/features/smartformfilling, last accessed Nov. 9, 2012.
Dashlane, "Securely Share web account passwords and important notes", https://dashlane.com/en/features/securesending, last accessed Nov. 9, 2012.
Bell, Timothy, et al., "System, Method, and Device for Customizing Online Merchant Payment Forms for Mobile Devices Without Merchant Integration," filed Apr. 3, 2012, U.S. Appl. No. 13/714,178.
FAIPP Pre-Interview Communication dated Apr. 1, 2016, U.S. Appl. No. 14/313,968, filed Jun. 24, 2014.
Gailloux, Michael A., et al., "System for Easing Customer Data Entry from Internet Advertising," filed Jun. 24, 2014, U.S. Appl. No. 14/313,968.
Restriction Requirement dated Jan. 23, 2017, U.S. Appl. No. 14/258,882, filed Apr. 22, 2014.
Gailloux, Michael A., et al., "Companion Applets for Web-Based Transactions," filed Apr. 22, 2014, U.S. Appl. No. 14/258,882.
Advisory Office Action dated Oct. 12, 2016, U.S. Appl. No. 14/313,968, filed Jun. 24, 2014.
FAIPP Office Action dated Jun. 8, 2016, U.S. Appl. No. 14/313,968, filed Jun. 24, 2014.
Final Office Action dated Aug. 12, 2016, U.S. Appl. No. 14/313,968, filed Jun. 24, 2014.
Decision on Appeal dated Mar. 22, 2017, U.S. Appl. No. 13/714,178, filed Apr. 3, 2012.
Notice of Allowance dated Jun. 22, 2017, U.S. Appl. No. 13/714,178, filed Apr. 3, 2012.
Office Action dated Jun. 15, 2017, U.S. Appl. No. 14/258,882, filed Apr. 22, 2014.

\* cited by examiner

COMPANION APPLETS FOR WEB-BASED TRANSACTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Non-cash transactions can be made in a variety of situations, for example, using credit, debit, gift, or other pre-paid cards at a point-of sale, or using a portable electronic device such as a tablet, personal digital assistant (PDA), or other device. However, because of issuers' fraud restrictions for remote (not in-person) transactions, it may not be possible to use certain types of payment options to complete remote transactions.

SUMMARY

In an embodiment, a method of completing a transaction using a portable electronic device comprising: sending, by a portable electronic device, to a first applet, wherein the first applet is associated with a vendor's web page, wherein the mobile device comprises a graphical user interface and a secure element, a request to initiate a transaction; and accessing, by a second applet, in response to a determination that the second applet is present on the portable electronic device, an application programming interface (API). The embodiment further comprising: retrieving, by the API, at least a portion of a profile on the secure element; passing, by the API, the at least a portion of the profile to the second applet; parsing, by the second applet, the at least a portion of the profile; reducing the data to a plurality of fields, wherein each field of the plurality of fields is required to complete the transaction; and sending, by the second applet, the parsed, reduced plurality of fields to the first applet.

In an embodiment, a system for completing a web-based transaction using a portable electronic device comprising: a portable electronic device comprising: a mobile applet, wherein the mobile applet is a companion applet to a web page applet associated with at least one web page, wherein the at least one web page comprises a plurality of fields used to complete a transaction and a secure element comprising a profile. The embodiment further comprising: an application programming interface (API), wherein the application programming interface retrieves at least a portion of the profile from the secure element in response to a determination by the web page applet that the mobile applet is present on the portable electronic device.

In an alternate embodiment, a method of completing a transaction using a portable electronic device comprising: receiving, by a first applet from a portable electronic device, a request to initiate a transaction, wherein the first applet is stored on a vendor's web page; determining, by the first applet, if a second applet is present on the portable electronic device, wherein the second applet is specific to the vendor's applet; and receiving, by the first applet, a portion of a profile from a secure element on the mobile device, wherein the portion of the profile comprises a plurality of fields. The embodiment further comprising completing the transaction in response to a determination that the second applet is present on the portable electronic device, wherein completing the transaction comprises authenticating, by a payment processor, that the plurality of key fields sent by the second applet to the first applet originated in the secure element of the portable electronic device, and wherein, in response to authentication, the transaction is treated as an in-person transaction by the vendor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
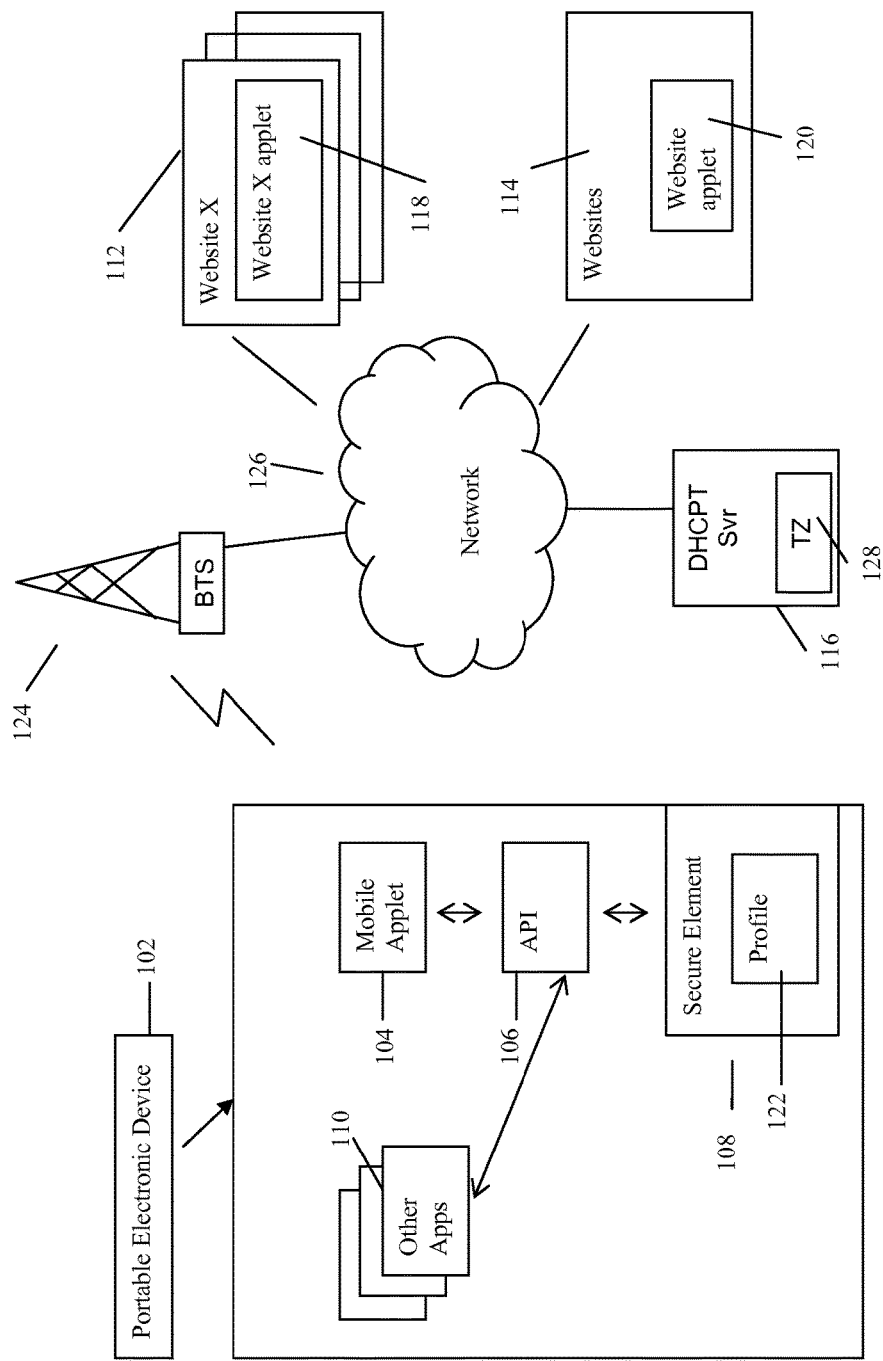
FIG. 1 is an illustration of an embodiment of a system for using a portable electronic device to complete a card-present transaction.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Portable devices such as mobile phones, tablets, personal digital assistants (PDAs) may be used for remote transactions or for near-field communication (NFC) transactions at a vendor of goods or services. As more devices are acquired, the range of uses for these portable devices is expanding into areas beyond browsers, email, texting, and voice calls. For example, device owners may use their portable electronic device to comparison shop between stores, look for sales, and ultimately make purchases from online retailers instead of or in addition to actually visiting the vendors' locations. However, issuers of payment options may not feel that they are protected against fraud during these remote transactions because, unlike in-person transactions where the vendor can require photo identification of the user in order for the credit card to be accepted, a user of the mobile phone may not have a way to authenticate themselves and their method(s) of payment. A payment option may be a credit card, check card, debit card, pre-paid card, gift card, or a protected card for specialized users (e.g. children), and may be used in conjunction with other methods of payment such as store credit, coupons, frequent buyer cards, and the like. The issuer of a payment option may be a financial institution or a vendor. The check-out process may therefore involve a tedious data-entry process where the user enters in their name, address, credit card number, expiration date, additional codes, and may also include additional verification steps that are cumbersome to complete on a portable device. As such, busy or frustrated users may abandon a fairly large percentage of attempted transactions. In addition, the payment option issuer may be charged a percentage of the sale or a flat rate by the vendor whose website is used because this transaction is identified as a card-not-present type of transaction, and as such is a transaction deemed to have a higher risk of fraud than a card-present type of transaction. This may be because the vendor sees this online payment method as an increased risk due to the risk of a party using another party's payment option for an online purchase without approval from that party. This could be because the payment option has been stolen, borrowed, or otherwise removed from the exclusive control of its owner or owners.

A card-not-present type of transaction is, as the name suggests, where a physical card has not been swiped into a reader at a point-of sale terminal. In some cases, if a fraudulent card-not-present transaction is reported, the issuer of the payment option may not be liable for the charges. In contrast, in a card-present type of transaction which is conventionally defined as one where a payment option is physically swiped at a point of sale, the bank that issued the payment option may be liable for restitution if there is a fraudulent transaction made. All payment processors, the parties who handle non-cash transactions, have different ways of calculating and applying fees and transaction charges. Each time a payment option transaction is processed through a vendor's account, the vendor may be charged an inquiry fee and a percentage of the total transaction. The inquiry fee may be a flat amount and the percentage charged may also be referred to as a credit card rate and is variable based upon the type of payment option used and the type of transaction. For example, each payment option issuer may have its own structure for credit rates, charging less when there is less risk of fraud, like when a person is present for the transaction with the card at the point-of-sale terminal, and charging a higher rate when the card is not present. In an effort to improve security of online transactions made with portable electronic devices, some issuers of payment options zone off certain card numbers provided for NFC transactions so that those cards can only be used for NFC transactions. The systems and methods disclosed herein present the user with a way to populate much of the information required by online merchants wherein most of the information is auto-populated. This leads to an increased percentage of completed online transactions as a result of the improved user experience as well as increased revenue for the vendor and the telecommunications provider.

The systems and methods disclosed herein may be applied when a user makes a purchase using a portable electronic device. For example, if a user is attempting to make a purchase of hunting equipment off of Amazon.com, the user selects the items they would like to purchase and puts those items in their online basket or shopping card. When the user wants to check out, they select a payment option from a list of payment options presented by the portable electronic device or by the vendor's website. The payment option may be a credit card, debit card, gift card, check card, or pre-paid card, or a combination thereof. An applet in the mobile web page ("mobile applet") receives the selection of the payment option and looks at the portable electronic device for a companion applet. If the mobile applet determines that the companion applet is present on the mobile phone, the companion applet presents a request for the portable electronic device user to enter in a Personal Identification Number (PIN) or a password. In some embodiments, a website, for example a website that sells hunting equipment, would have its own mobile applet and a companion applet specific to the hunting equipment website. In that embodiment, each website with a mobile applet may have its own companion applet on a portable electronic device. This PIN or password could be a combination of numbers, letters, patterns, or other methods of identification. In an embodiment, the PIN or password is verified against data sent by the telecommunications provider. It is considered that either a PIN or a password may be used for the described authentication, for conciseness the descriptions below only describe the use of a PIN for authentication. The companion applet receives the PIN and, in response to receiving the PIN and verifying the PIN, opens up at least one application programming interface (API) of the telecommunications provider or the mobile device.

In alternate embodiments, the companion applet may not be specific to a website but may be specific to a conglomerate or other groups of associated websites or vendors where one website is used by a plurality of vendors. In another embodiment, the mobile applet of a website such as a website for hunting equipment looks for a companion applet on the portable electronic device that is the same companion applet used by all mobile applets. In yet another embodiment, the website is one of a category such as apparel and accessories, home and garden, electronics, food and beverage, or other categories of goods and services and the mobile applet associated with that website looks for a companion applet on the portable electronic device for that category of website or purchase.

In some embodiments, the API may use local rules to determine if the telecommunications provider has a strategic relationship with the issuer of the selected payment option. This determination may be made through an internal search of the mobile device and/or the telecommunications provider's records for an authorization table. In an embodiment, if no internal rules are set or the dates at which they were set are too old for the table to be refreshed, a message is sent to the telecommunications server to update the table. If a strategic partnership is found, the API sends a request to the secure element for payment information related to the selected payment option. A profile is located either on the mobile device or on the vendor's web page. The profile may comprise the user's address, name, phone number(s), email, social media contact information, payment option numbers, payment option expiration dates, and payment option supplemental identification codes. The mobile applet invokes a function of the API, in response to the function invocation, the API requests information from the secure element. The secure element passes at least a portion of the profile information to the API. The API identifies which payment option issuer was selected and what fraud rules or other payment rules apply to that payment option issuer. The API, upon receiving the information from the secure element, then parses the data from the online profile and reduces the data to key fields. The key fields are items of information used by the vendor and/or the payment option issuer or payment processor to complete the transaction. These fields may be referred to as key fields, payment fields, or transaction completion fields. The key fields may then be passed back to the mobile applet which may request that the user enter additional information such as a Card Verification Value (CVV) code, coupon, discount, or frequent shopper identification information. In some embodiments, information known only to the secure element may be provided, this information may be encrypted and promotes a card-present type of transaction. The companion applet passes the data back to the mobile applet which then populates the key fields, leaving the user with a reduced amount of fields to manually enter. In some embodiments, the user may not need to enter any information after the PIN number is entered and verified and after the information for the key fields is sent from the companion applet to the mobile applet. The information from the secure element that is passed to the point of sale behind the website provides enough assurance of authenticity to the vendor so that the vendor treats this transaction as a card-present transaction. The information maybe be information that came from the secure element as opposed to being manually entered in the relevant fields. The card-present flag may be set by leveraging the same secured transaction that passes the credentials or by checking the passed information against the secure element from the handset. In this example, if the vendor's website and/or applet on the website receives a particular token, the applet and/or website can do a back check to make sure that the token matches the secure element of the portable device from where it originated. It is noted that, while the website or vendor application used to make the purchase may be developed, operated, and/or owned by the vendor, a third party payment processor may handle the actual processing of the payment.

This payment structure may be implemented under one or more business models. For example, in one embodiment the telecommunications provider has a strategic relationship with card issuers wherein the telecommunications provider receives a fee from the provider of the payment option when a transaction is completed using that payment option. In another example, the payment option issuer pays the telecommunications provider a flat fee for every device using the system and/or method. Turning to the components of this disclosure, the secure element is a restricted area of a mobile device that requires special permissions, for example a key or a token, in order to gain access. The secure element in this case is on the back end of the transaction, that is, it does not initiate the transaction nor is it used to initiate the transaction, and the vendor website, where the activity occurs prior to purchase, is on the front end of the transaction, that is, the vendor website is used to initiate the purchase transaction. The mobile applet or application may be an integrated applet that recognizes a certain number or type of vendors and handles the details of different merchant websites. In some embodiments, the applet may have a plurality of mobile applets from a plurality of vendors and parses the information received with respect to the selection of payment option to determine what information is needed and to request that information from the SE, parsing it, and filling in the correct fields in order to complete the transaction. Between the secure element and the mobile application there is an API from the telecommunications provider that may work with a trusted service manager (TSM) to access the data for shipping, billing, and authentication stored in the secure element. The authentication provided may allow the vendor to treat the transaction like an in-person transaction which may allow them to pay lower fee for that transaction. The parsing step is used to ensure that information required for the transaction is used to fill in the fields, the parsed information is passed to the web applet which determines how to populate the fields. Once the key fields have been populated, the transaction may be completed.

Figure 2:
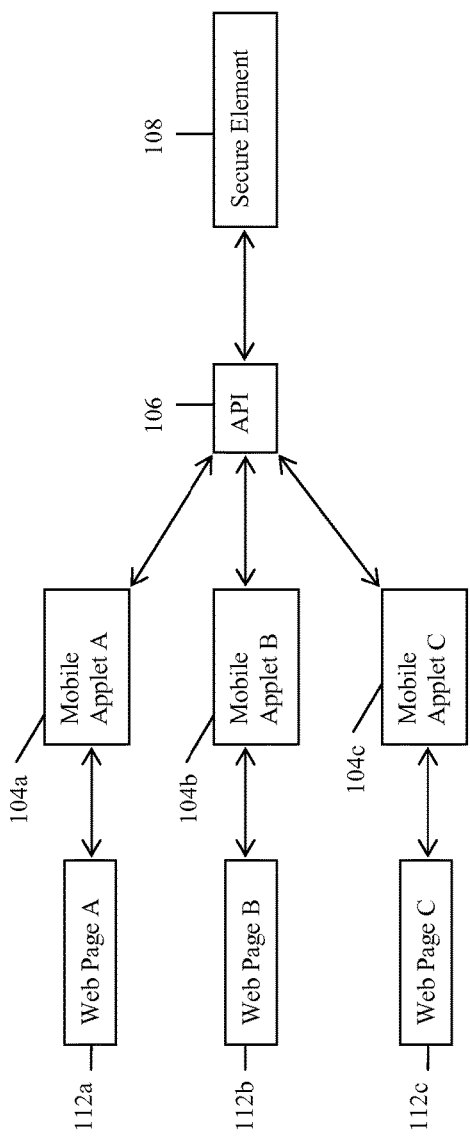
FIG. 2 is an illustration of an alternate embodiment of a system for using a portable electronic device to complete a card-present transaction.

FIG. 1 is an illustration of an embodiment of a system for making payment transactions. The portable electronic device 102 comprises a mobile applet 104, an application programming interface (API) layer 106, a profile 122, and a secure element 108. The API layer 106 may belong to the telecommunications provider and acts as a buffer, mediator, or isolator between the secure element 108 and the mobile applet 104. In addition, the portable electronic device 102 may comprise a plurality of other applications 110. The API 106 can know some of the information stored on the secure element but maintains the secrecy of keys or tokens that need to be provided to the secure element to invoke functions offered by the secure element 108. In this way, the API 106 also can prevent attempts to invoke disallowed privileged functions of the secure element, for example, malicious attempts by a corrupt mobile applet to access the secure element. This is because mobile applets may have unknown and untested security because the mobile applets may be provided by vendors who have not tested the security or have not tested the security under rigorous conditions. The portable electronic device 102 communicates with a website 112 to retrieve information to complete a payment transaction. In an embodiment, the website 112 has an applet 118, and when the portable electronic device 102, which may also comprise a browser (not pictured), attempts to complete a payment transaction, the website's applet 118 determines whether the portable electronic device 102 has the mobile applet 104, which may also be referred to as the companion applet. In an embodiment, the website applet 118 is an applet specific to website 112. In an embodiment, as pictured in FIG. 2, each web page A 112a, B 112b, and C 112c, determines if the mobile applet 104 corresponding to their particular web page is present. For example, the web page A 112a would determine if mobile applet A 104a was present on the portable electronic device 102, the web page B 112b would determine if mobile applet B 104b was present on the portable electronic device 102, and the web page C 112c would determine if mobile applet C 104c was present on the portable electronic device 102. In an alternate embodiment, a plurality of websites 114 have one website applet 120 that looks for mobile applet 104 in the portable electronic device 102. In either embodiment, if the website at 112a-112c or 114 determines that the mobile applet 104 is on the portable electronic device 102, the mobile applet 104 accesses an application programming interface 106 (API) which can access information in the secure element 108. In some embodiments there may be a trusted dynamic host configuration protocol (DHCPT) server 116 which may comprise a trusted security zone 128, and a base transceiver station (BTS) 124. The base transceiver station 124 provides a wireless communication link to the mobile device 102 according to at least one of a code division multiple access (CDMA), a global system for mobile communication (GSM), a long term evolution (LTE), a worldwide interoperability for microwave access (WiMAX), or another wireless communication protocol. In an embodiment, the base transceiver station 124 may be a femtocell. The base transceiver station 124 couples the mobile device 102 to a network 126. Alternatively, in an embodiment, the mobile device 102 may be coupled to the network by a wireless access point, for example a WiFi wireless access point or a Bluetooth® access point.

Figure 3:
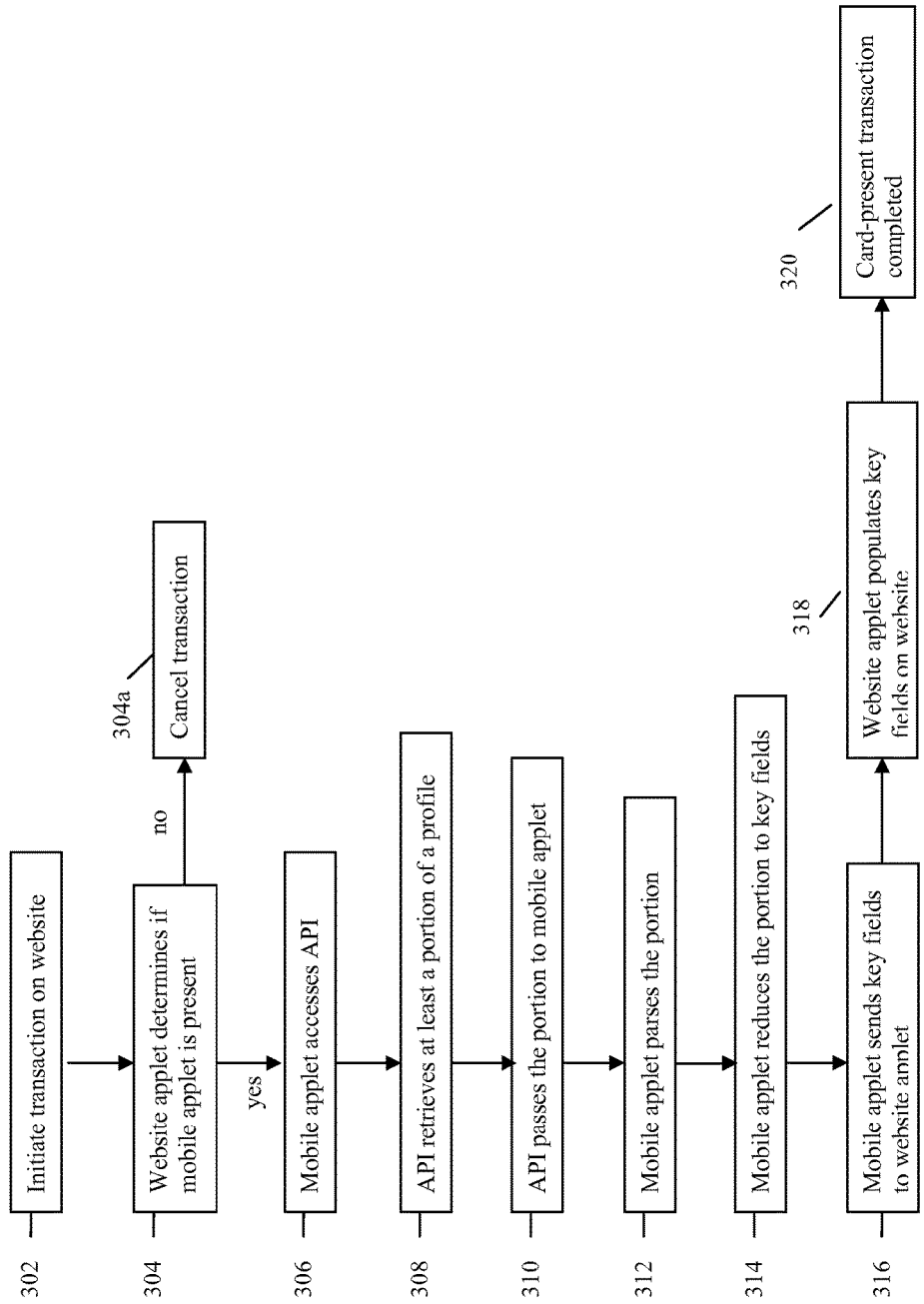
FIG. 3 is a flowchart of an embodiment of a method for completing a card-present transaction on a portable electronic device.

FIG. 3 is a flowchart of an embodiment of a method for completing a payment transaction using a portable electronic device. Turning to FIG. 3, the system of FIG. 1 and FIG. 2 may be initiated when a user initiates a transaction on a website at block 302 to purchase goods or services. The website applet determines if a mobile applet is present on the portable electronic device at block 304. If the website applet determines that the mobile applet is not present at block 304, the transaction may be cancelled at block 304*a*. If the website applet determines that the mobile applet is present at block 304, the mobile applet accesses the application programming interface (API) layer on the portable electronic device at block 306. The API acts as a buffer and/or mediator between the website applet and the secure element and retrieves at least a portion of a profile from the secure element at block 308. When the transaction is initiated on the website at block 302, part of the initiation includes a website receiving a selection of a payment option. The payment option may include a credit card, store card, check card, pre-paid card, debit card, or other payment option. The profile on the secure element may comprise a plurality of information including a CVV number or other verification number, a payment option expiration date, restrictions on what sort of purchases can be made with that payment option, an address, a name, phone number(s), an email, a plurality of social media contact information, a history of previous transactions using that payment option, and other information that may be specific to the selected payment option including rewards program information.

At block 310, the API, after retrieving at least a portion of the profile at block 308, passes the portion of the profile retrieved to the mobile applet at block 310. The mobile applet parses the portion of the profile at block 312 and reduces the portion to key fields at block 314. The key fields may be selected from a plurality of key fields, the key fields are those that may be used to complete the transaction. In an embodiment, the key fields may be determined by the website. In an alternate embodiment, the key fields may be determined by the issuer of the selected payment option, and in another embodiment the key fields may be determined by a third party payment processor. The key fields may comprise any of the fields in the online profile and may be related to the selected payment option or the portable electronic device and the user of the portable electronic device. At block 316, the mobile applet sends the key fields to the website applet which populates the key fields on the website at block 318. It is appreciated that this part of the transaction may involve a third-party payment processor. At block 320, the transaction is completed and treated as a card-present transaction.

Figure 4:
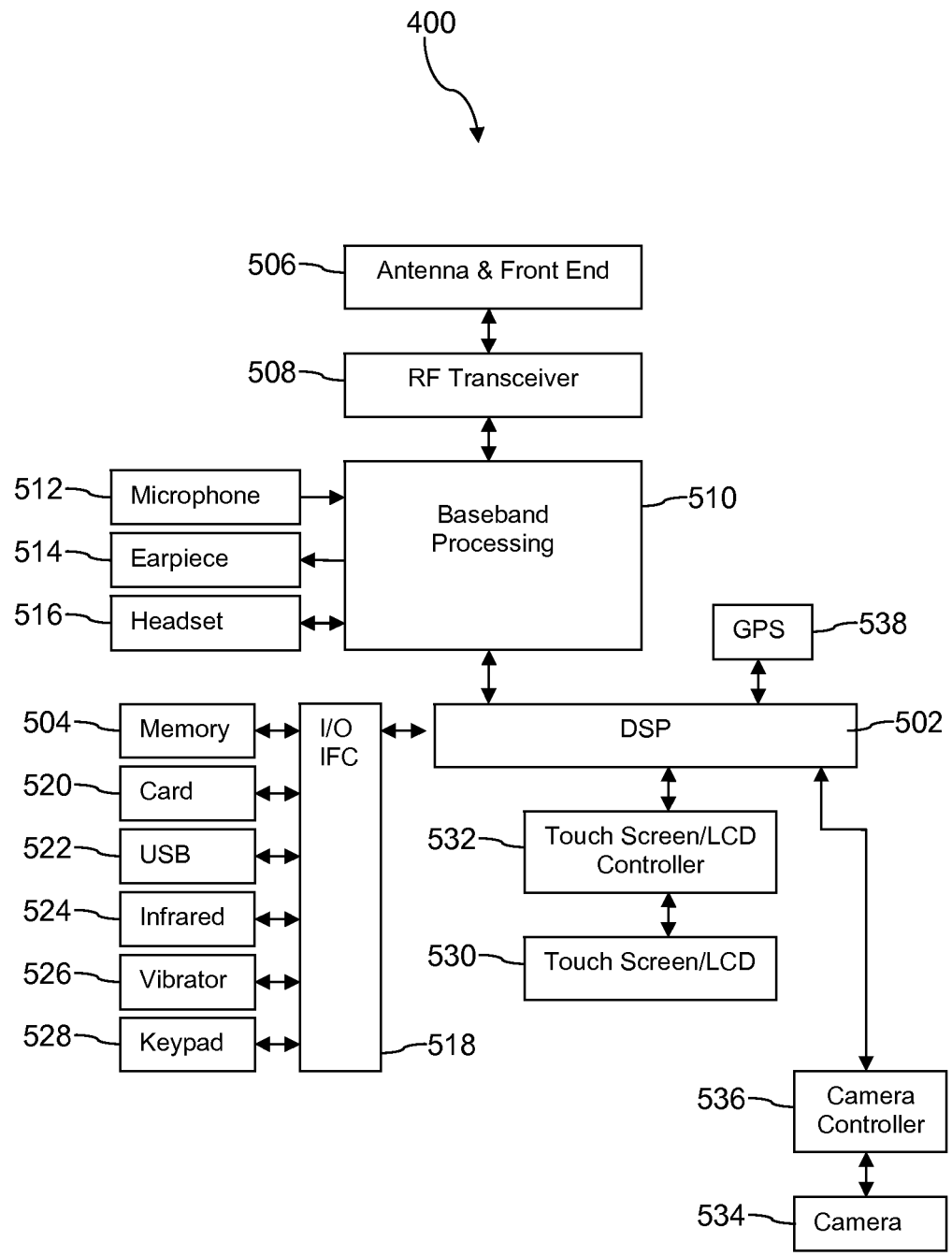
FIG. 4 is an illustration of an embodiment of a configuration of a portable electronic device.

FIG. 4 shows a block diagram of a portable electronic device. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
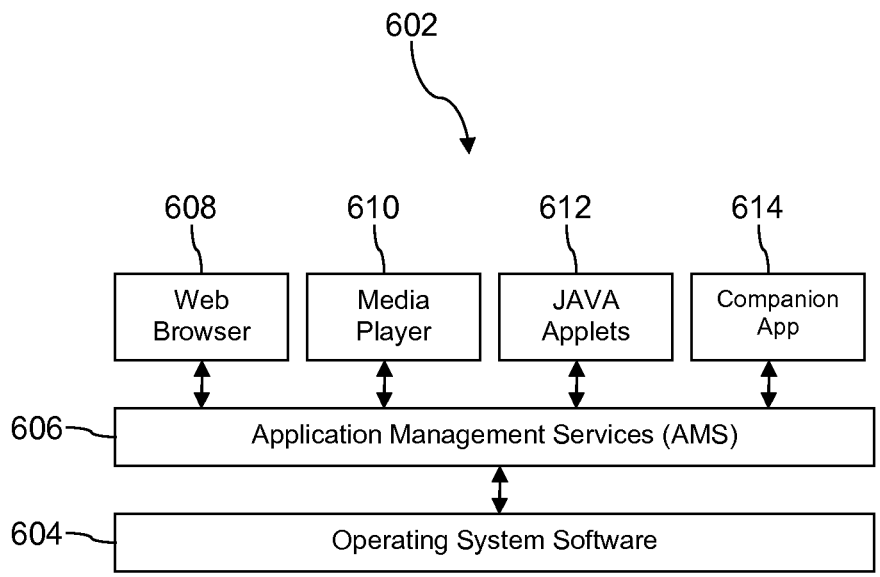
FIG. 5A illustrates a software environment that may be implemented by a portable electronic device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and at least one companion app 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
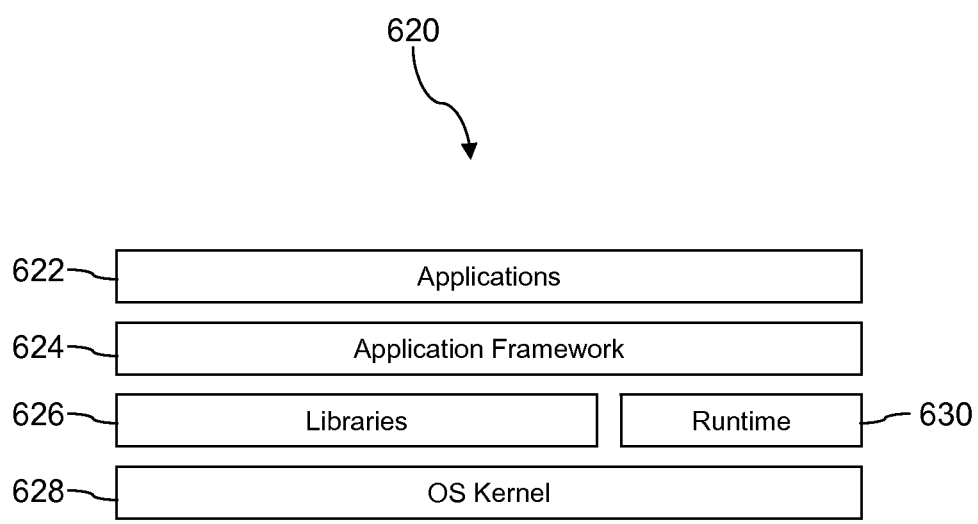
FIG. 5B illustrates an alternative software environment that may be implemented by a portable electronic device according to an embodiment of the disclosure.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
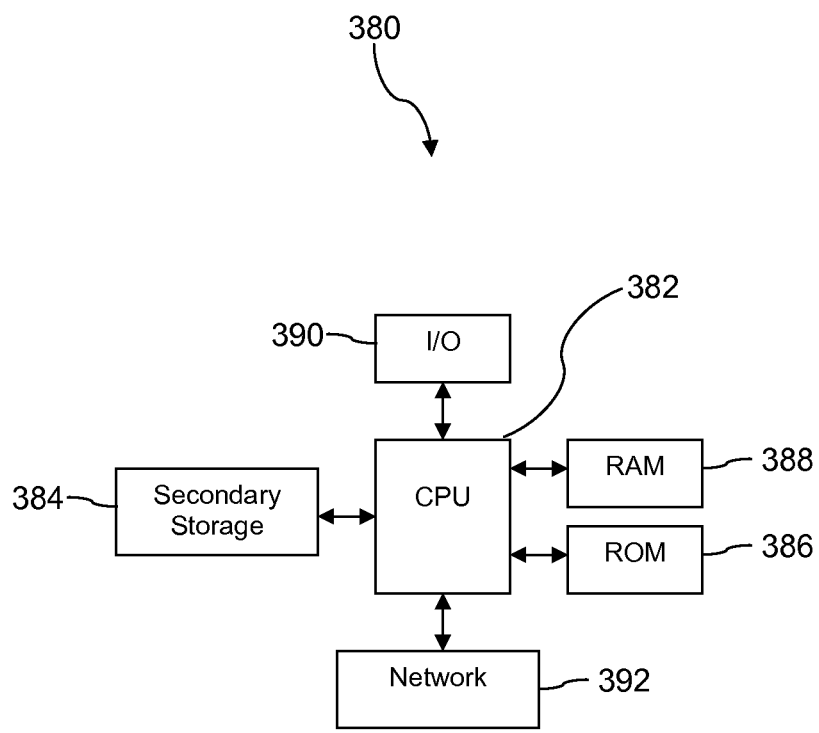
FIG. 6 illustrates a computer system suitable for implementing one or more embodiments disclosed herein.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing a card-not-present transaction between a vendor and a portable electronic device connected to a telecommunications network, comprising:

sending, by a portable electronic device connected to a telecommunications network, a selected payment option to a web page applet to initiate a card-not-present transaction, wherein the web page applet is associated with a vendor's web page, and wherein the portable electronic device comprises a graphical user interface and a secure element;

determining, by the web page applet, that a mobile applet is present on the portable electronic device;

accessing, by the mobile applet, an application programming interface (API);

determining, by the API, that there is a relationship with the selected payment option based on an authorization table;

in response to the determination that there is a relationship with the selected payment option, retrieving, by the API, at least a portion of a profile on the secure element;

passing, by the API, the at least the portion of the profile to the mobile applet;

parsing, by the mobile applet, the at least the portion of the profile;

reducing, by the mobile applet, data from the at least the portion of the profile to a plurality of fields, wherein each field of the plurality of fields is required to complete the card-not-present transaction;

sending, by the mobile applet, the reduced data in the plurality of fields to the web page applet associated with the vendor's web page;

authenticating, by a payment processor, that the reduced data in the plurality of fields sent by the mobile applet to the web page applet originated in the secure element of the portable electronic device; and in response to the authenticating, completing, by the payment processor, the card-not-present transaction using the reduced data in the plurality of fields that originated in the secure element of the portable electronic device, wherein the vendor treats the card-not-present transaction as a card-present transaction based on the authenticating.

2. The method of claim 1, further comprising:

sending, by the mobile applet, to the portable electronic device, in response to the determining that the mobile applet is present on the portable electronic device, a request for entry of a pre-determined PIN number;

receiving, by the mobile applet, an entered PIN number; and determining, by the mobile applet, whether the entered PIN number corresponds to the pre-determined PIN number.

3. The method of claim 2, further comprising accessing the mobile applet in response to the determination that the entered PIN number corresponds to the pre-determined PIN number.

4. The method of claim 2, wherein the predetermined PIN number is set during at least one of a purchase of the portable electronic device, issuance of a payment option, or during a previous purchase on the vendor's website.

5. The method of claim 1, further comprising populating, by the web page applet, the plurality of fields on the vendor's web page in response to receiving the parsed, reduced plurality of fields from the mobile applet, and wherein populating the plurality of fields completes the card-not-present transaction.

6. The method of claim 1, wherein the profile comprises at least one of an address, a name, a birth date, an expiration date of a payment option, a remaining balance of the payment option, a credit card verification number, and a history of previous transactions using the payment option.

7. The method of claim 1, wherein the mobile applet is a companion applet to a plurality of applets associated with a plurality of vendors' web pages.

8. A system for completing a web-based card-not-present transaction between a vendor and a portable electronic device connected to a telecommunications network comprising:

a portable electronic device connected to a telecommunications network comprising:

a mobile applet that is a companion applet to a web page applet associated with a vendor's web page, wherein the web page applet receives a selected payment option to initiate a card-not-present transaction, and wherein the vendor's web page comprises a plurality of fields used to complete the card-not-present transaction;

a secure element comprising a profile; and an application programming interface that:

determines that there is a relationship with the selected payment option based on an authorization table, and retrieves and passes at least a portion of the profile from the secure element to the mobile applet in response to the determination that there is a relationship with the selected payment option, wherein the mobile applet parses and reduces data from the at least the portion of the profile to the plurality of fields and sends the reduced data in the plurality of fields to the web page applet; and a payment processor that:

authenticates that the reduced data in the plurality of fields sent by the mobile applet to the web page applet originated in the secure element of the portable electronic device, and in response to the authentication, completes the card-not-present transaction using the reduced data in the plurality of fields that originated in the secure element of the portable electronic device, wherein the vendor treats the card-not-present transaction as a card-present transaction based on the authentication.

9. The system of claim 8, wherein the profile comprises at least one of an address, a name, a birth date, a CVV code, an expiration date of a payment option, a remaining balance of the payment option, a credit card verification number, and a history of previous transactions using the payment option.

10. The system of claim 8, wherein the web page applet determines that the mobile applet is present on the portable electronic device, and wherein, in response to the determination that the mobile applet is present on the portable electronic device, the mobile applet sends a request for entry of a pre-determined PIN number to the portable electronic device, receives an entered PIN number, and determines whether the entered PIN number corresponds to the pre-determined PIN number.

* * * * *